April 21, 1925.

W. W. GIBB 1,534,941

GRAIN DRILL ATTACHMENT

Filed Feb. 10, 1922

Inventor
William W. Gibb,

By
Attorney

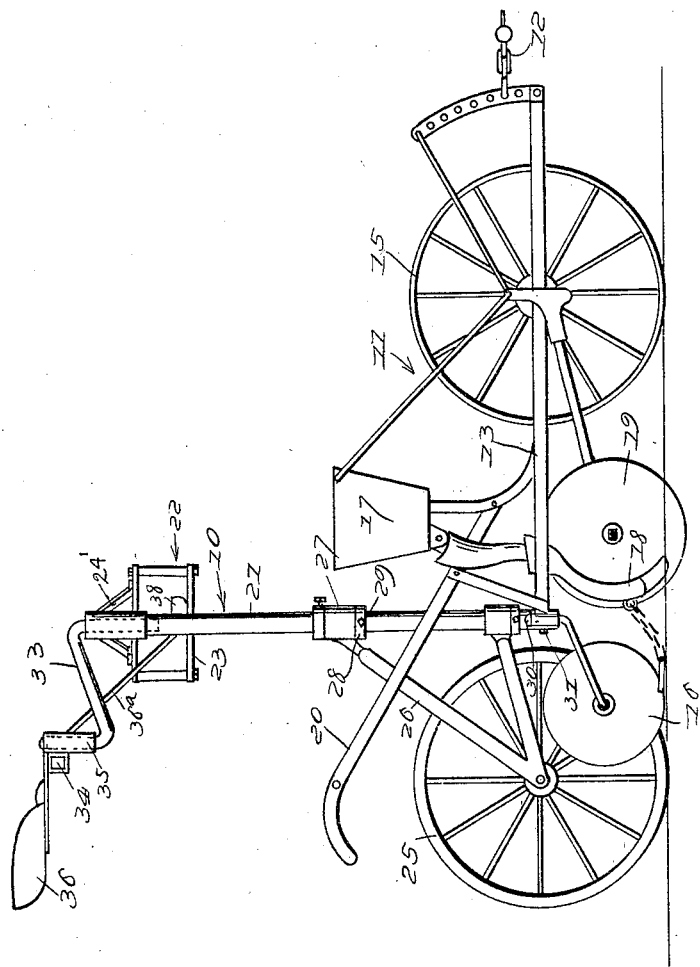

April 21, 1925. 1,534,941
W. W. GIBB
GRAIN DRILL ATTACHMENT
Filed Feb. 10, 1922 3 Sheets-Sheet 3
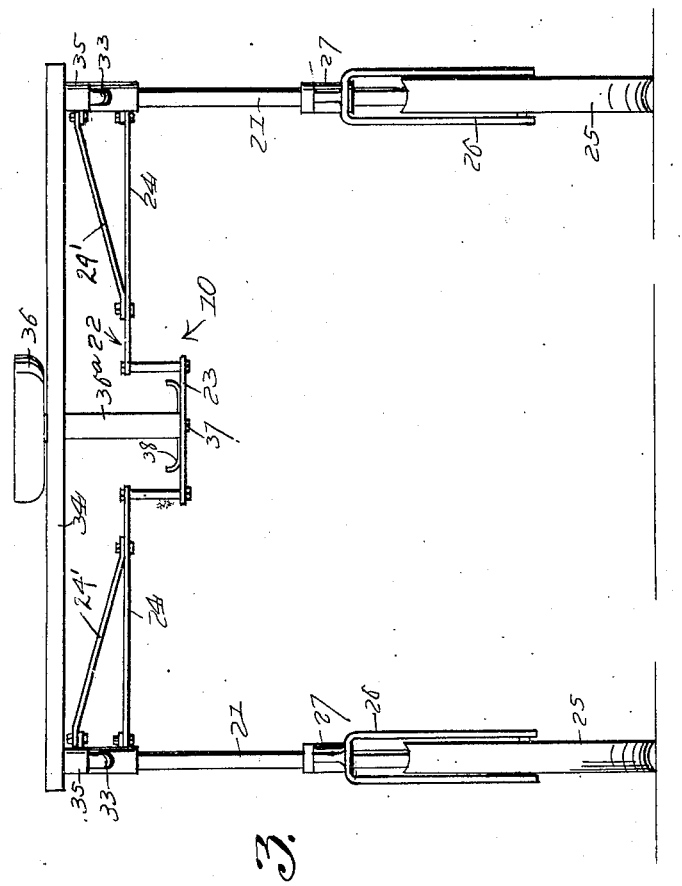
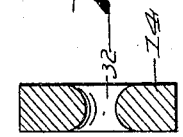
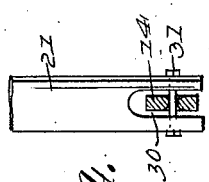
Inventor
William W. Gibb,
By
Attorney Patented Apr. 21, 1925.

1,534,941

UNITED STATES PATENT OFFICE.

WILLIAM W. GIBB, OF IMPERIAL, NEBRASKA.

GRAIN-DRILL ATTACHMENT.

Application filed February 10, 1922. Serial No. 535,560.

*To all whom it may concern:*

Be it known that WILLIAM W. GIBB, a citizen of the United States of America, residing at Imperial, in the county of Chase and State of Nebraska, has invented new and useful Improvements in Grain-Drill Attachments, of which the following is a specification.

The object of the invention is to provide a grain drill assembling and riding frame for use in the control of wheat planting machines when used in the corn field for drilling wheat between and parallel with the rows of corn, and the planting of which is conducted after the corn has reached a considerable height; and more particularly it is the object to provide an apparatus for this purpose which will enable a single operator while occupying a riding frame to control a plurality of planters or planting mechanisms operating respectively in the spaces between different rows or hills of corn, the adjustment of the assembling and riding frame to the spacing between the rows of corn being accomplished automatically and without effecting the position of the seat of the rider or operator; and with these objects in view the invention consists in a construction and combination of parts of which a preferred embodiment is shown in the accompanying drawings, wherein:—

Figure 2 is a side view of the same.

Figure 3 is a rear view of the apparatus.

Figure 4 is a detail view showing the connection between the frame of the grain drill and the upright of the riding frame.

Figure 5 is an enlarged sectional view of the cross bar of the grain drill frame.

Figure 1:
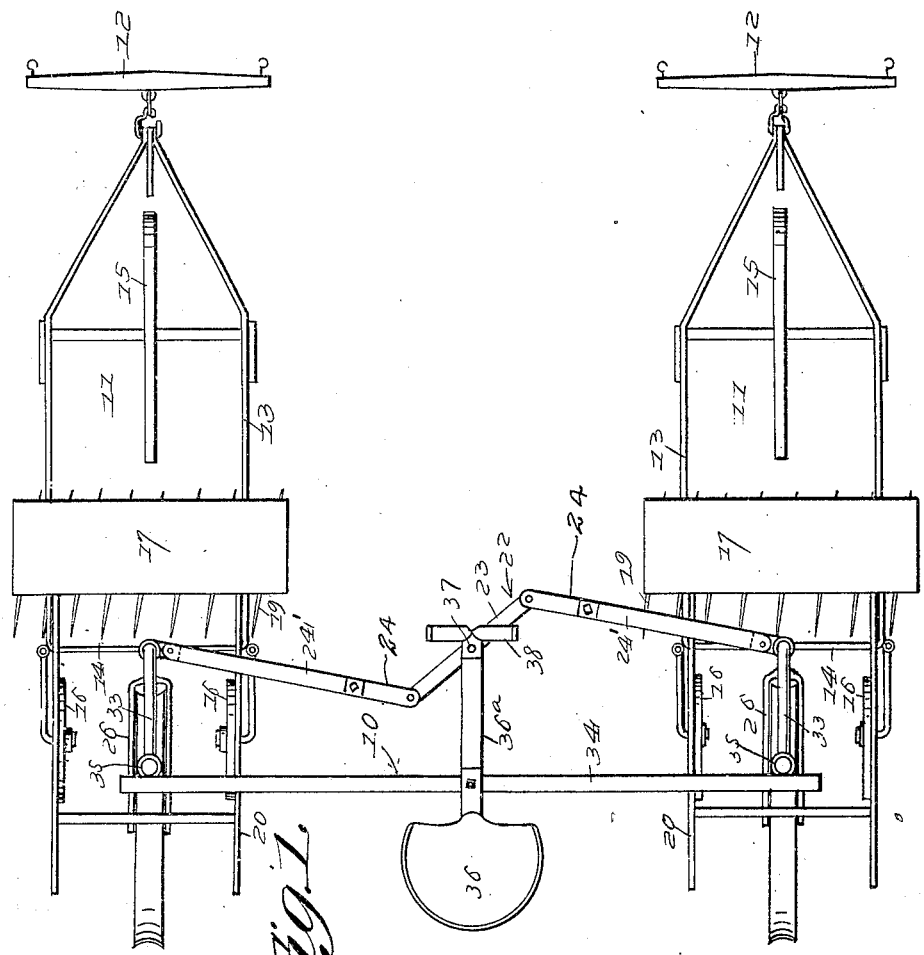
Figure 1 is a plan view of an apparatus embodying the invention showing the same in connection with two grain drills or planting mechanisms each of which is adapted to be drawn by a single draft animal.

The riding frame which is indicated generally at 10 is illustrated in the drawing as used in connection with two grain drills indicated at 11 which are shown and may be of the conventional or any preferred type having independent draft appliances 12 to which may be connected horses or other draft animals designed respectively to travel in the intervals between rows of grain, and without attempting to specifically describe the particular grain drills herein shown, it may be stated that each embodies essentially a frame 13 having a plurality of cross bars 14 and carried by the front wheel 15 and rear castor wheels 16, and seed boxes 17 from which extends a spout 18, and a drilling disk 19, all as clearly shown in Figure 2, such mechanism as in the ordinary practice being guided by suitable handles 20.

The riding attachment which is designed as a means of assembling and holding in proper relation a plurality of grain drills for simultaneous operation between different rows of corn consists essentially of an arch having uprights 21 and a transverse member or cross bar 22 constructed in the form of a toggle lever with a centrally pivoted intermediate member 23 terminally connected by the links 24 respectively with the uprights 21, and said uprights being supported by wheels 25 mounted upon brackets 26 which are swiveled by means of the sleeves 27 upon the uprights. To assist in maintaining the links 24 in a horizontal plane, the latter are provided with horizontal members 24' also having terminal connections with the uprights 21. These sleeves are supported and held in adjusted relation with the uprights by means of collars 28 held in place by setscrews 29 or the equivalent thereof.

The connection between each drill frame and the riding frame is effected in the construction illustrated by extending one of the cross bars 14 of the former through a yoke 30 formed by slotting the lower end of the upright 21 and extending a transverse bolt 31 through the bar in spanning relation with the yoke. The opening 32 in the cross bar is preferably cut away or enlarged terminally as indicated clearly in Figure 5 to permit of a rocking movement in a vertical plane of the drill frame while maintaining the assembly of said frame with the upright of the arch.

The said uprights are provided at their upper ends with crank arms 33 preferably extended in substantial parallelism with the path of movement of the drill frames and preferably rearwardly from the transverse vertical plane of the uprights and are terminally connected by a transverse bar 34 with which they have pivotal connection by means of the sleeves 35, and carried by this transverse bar is a riding seat 36 which by reason of the rearward direction of said crank arms 33 is disposed substantially in the transverse plane of the axes of the supporting wheels 25 which uphold the riding frame and which by reason of the mounting thereof are free to follow the direction of movement respectively of the drills.

The seat is preferably provided with a brace 36ª attached to the center of the cross bar 34 and is connected by the pivot 37 with the center of the toggle lever 23, and preferably foot rests 38 are attached to the front end of said brace for the convenience of the occupant of the seat.

The transverse seat supporting bar 34 being of unitary construction and therefore of invariable length and having bearing heads 35 in which the terminals of the crank arms are mounted, it will be obvious that any tendency of the drill frames to move toward or from each other will cause a corresponding movement of the uprights 21 moving about the axes represented by the pivotal mountings of said crank arms upon the seat supporting bar, but any tendency of either upright to move transversely will by reason of the toggle lever cause a corresponding movement of the opposite upright, so that in all relative positions as to spacement of the grain drills the seat 36 will remain in the central position between the planes of said drills. As there is no restriction to the lateral movement of the grain drills it is, therefore, obvious that in order to maintain a proper working relation of the parts it is only necessary for the occupant of the seat to keep the draft animals in the proper positions in the intervals between the rows of corn, and the direct following of the draft animals by the grain drills will be accommodated by the yielding one way or the other of the toggle lever connection between the uprights of the arch, to insure a proper operation of the mechanism.

The vertical extent of the uprights as will be obvious is designed to provide for locating the cross bar of the arch above the plane of the corn in the row between those in which the drills are operating or at a sufficient distance from the ground to come in contact with the relatively flexible portions of the corn stalks, so that the deflection or bending of the latter by the contact of the cross bar will involve no breakage or other injury thereto.

Having described the invention, what is claimed as new and useful is:—

A drill coupling structure comprising uprights mounted upon the drills, supporting wheels castered to the uprights, crank arms pivoted at the upper ends of the uprights, a transverse bar pivotally connected with the crank arms, a seat standard mounted at the intermediate portion of the transverse bar, a link pivoted to the seat standard and outer links pivoted at their inner ends to the ends of the first mentioned link and pivoted at their outer ends to the uprights and crank arms.

In testimony whereof he affixes his signature.

WILLIAM W. GIBB.